June 14, 1955  F. I. BROUSSARD  2,710,514

IMPLEMENT TONGUE AND TRUCK ASSEMBLY

Filed Dec. 30, 1952  2 Sheets-Sheet 1

INVENTOR
FRANCIS I. BROUSSARD

BY McMorrow, Berman + Davidson
ATTORNEY

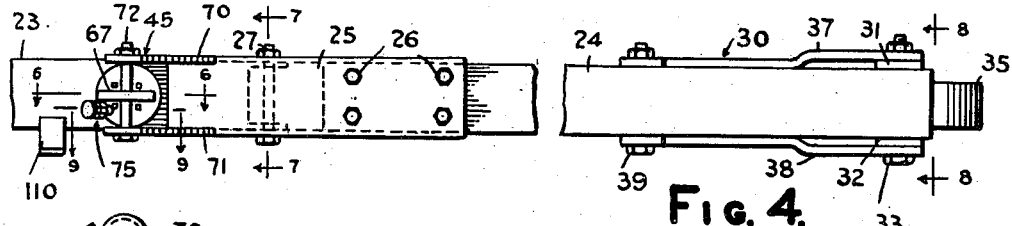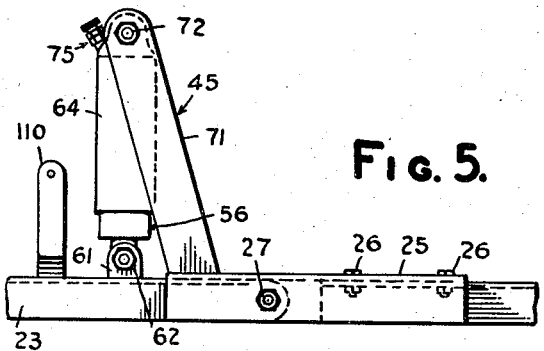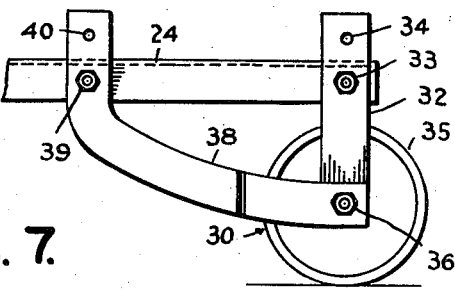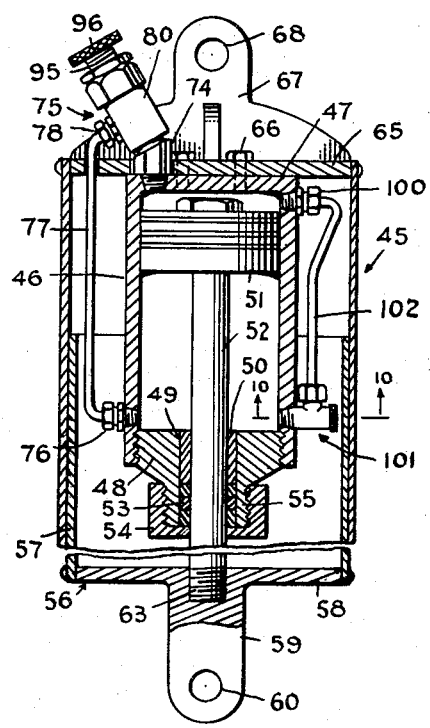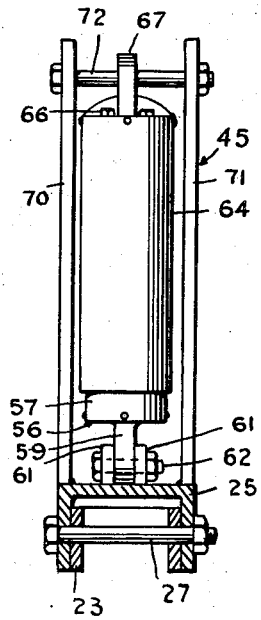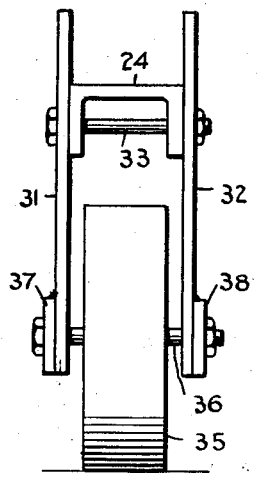

United States Patent Office
2,710,514
Patented June 14, 1955

2,710,514

IMPLEMENT TONGUE AND TRUCK ASSEMBLY

Francis I. Broussard, Iowa, La.

Application December 30, 1952, Serial No. 328,740

6 Claims. (Cl. 56—25.4)

This invention relates to tongue and front truck assemblies for implements, such as mowing machines, harvester-thresher combines, certain types of cultivating machines, and other wheel mounted, tractor towed machines having cutting or tilling elements which must be raised over obstructions and steep rises for the successful operation of the implement, and more particularly to a tongue and truck assembly including a jointed tongue which permits the associated truck to ride up over steep inclines and obstructions without an upward movement of the associated towing means.

It is among the objects of the invention to provide a front truck and tongue assembly for an implement, such as a mowing machine having a power driven cutter rotatable about a substantially vertical axis, wherein the tongue is attached at one end to the implement and projects forwardly from the implement and the front truck is attached to the tongue at a location spaced from the front end of the implement and maintains the front portion of the cutter a predetermined distance above the ground and raises the front portion of the cutter when the truck rides up a steep incline or over an obstruction to prevent the front portion of the cutter from digging into the ground or the obstruction; in which the tongue is provided at a location ahead of the truck with a pivotal joint having a substantially horizontal axis extending transversely of the tongue to permit the tongue to bend or buckle upwardly intermediate its length when the associated truck rises over an obstruction or rides up a steep incline, such as a steep side of a ditch; in which time delay means are provided on the tongue to prevent the tongue returning to its normally straight condition after having been bent upwardly until the cutter has passed over the obstruction or incline; in which means are provided to disengage the implement clutch while the truck and the cutter are passing over a steep incline or an obstruction; in which the truck may be provided with ground-engaging wheels or skids or with both wheels and skids; and which is strong and durable in construction, economical to manufacture, easy to install, and positive and effective in operation.

Other objects and advantages will become apparent from a consideration of the following description and the appended claims in conjunction with the accompanying drawings, wherein:

Figure 4 is a top plan view on an enlarged scale of a fragmentary portion of the tongue and truck assembly;

Figure 5 is a side elevational view of the fragmentary portion of the tongue and truck assembly illustrated in Figure 4;

Figure 6 is a transverse cross sectional view on an enlarged scale on the line 6—6 of Figure 4;

Figure 7 is a transverse cross sectional view on an enlarged scale on the line 7—7 of Figure 4;

Figure 8 is a transverse cross sectional view on an enlarged scale on the line 8—8 of Figure 4;

Figure 1:
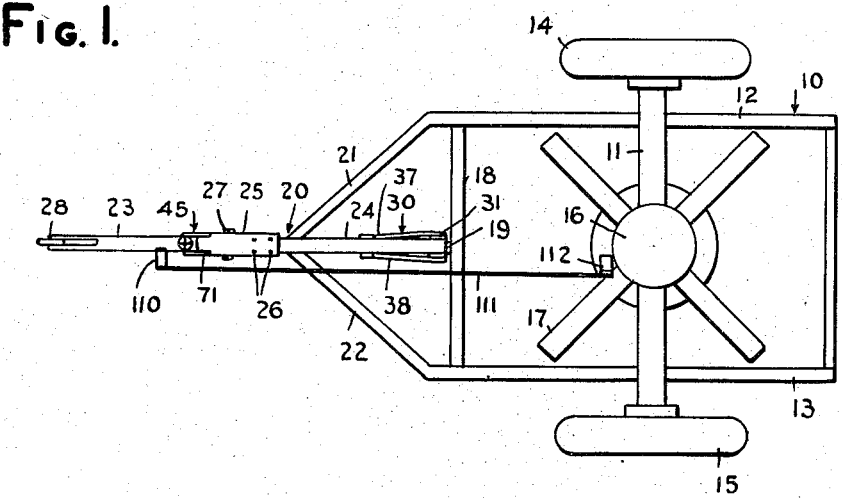
Figure 1 is a top plan view of an implement having a tongue and truck assembly illustrative of the invention installed thereon.

With continued reference to the drawings, the implement illustrated includes a frame, generally indicated at 10, of elongated, rectangular shape and an axle 11 extending transversely across the frame 10 intermediate the length of the frame and secured to the side members 12 and 13 of the frame with the longitudinal center line of the axle substantially at right angles to the longitudinal center line of the frame 10. Ground-engaging wheels 14 and 15 are mounted one on each end of the axle 11 at locations spaced from the outer sides of the corresponding frame side members 12 and 13 and a power plant 16 is mounted on the axle 11 substantially midway between the frame side members 12 and 13. A rotatable cutter 17 for mowing grass, hay, or other standing crop growth, is disposed below the power plant 16 and rotated by the power plant about a substantially vertical axis through the intermediacy of a releasable clutch, not illustrated.

The front cross member 18 of the frame 10 has substantially at its midlength location a forwardly extending, tongue-attaching lug 19 and an elongated tongue, generally indicated at 20, is secured at one end to the lug 19 and extends forwardly from the front cross member 18 substantially perpendicular to the latter. The tongue is maintained in this position relative to the front cross member 18 by the diagonal braces 21 and 22 extending convergently relative to each other from the respectively opposite sides of the frame 10 at the corresponding ends of the cross member 18 to the tongue 20 at a location intermediate the length of the tongue.

The tongue 20 is provided in two separate parts 23 and 24 disposed in longitudinal alignment with each other and spaced apart at their adjacent ends. The rear part 24 of the tongue is connected at its rear end to the lug 19 and extends forwardly of the front end of the braces 21 and 22 and a channel member 25 is disposed on the top of the rear portion 24 of the tongue and receives that part of the rear portion 24 of the tongue extending forwardly of the front ends of the diagonal braces. The channel member 25 is secured to the tongue portion 24 by suitable means, such as the bolts or rivets 26 and extends forwardly of the front end of the tongue portion 24 to receive the rear end part of the front tongue portion 23. A pivot pin or bolt 27 extends through the flanges of the channel member 25 ahead of the front end of the rear tongue part 24 and through the front tongue portion 23 forwardly of the rear end of this front tongue portion to provide a pivotal joint between the tongue portions 23 and 24. The axis of the pivot pin 27 extends transversely of the tongue, substantially parallel to the implement axle 11 and is normally substantially horizontally disposed. At its front end the tongue part 23 is provided with a clevis or eye formation 28 by means of which the front end of the tongue is connected to the hitch bar of a towing tractor or other suitable implement towing device.

A front truck, generally indicated at 30, is mounted on and depends from the rear tongue portion 24 adjacent the rear end of this rear tongue portion and the truck comprises a pair of legs 31 and 32 disposed one at each side of the tongue portion 24 at the rear end of this portion and depending substantially perpendicularly from the rear tongue portion in spaced apart and substantially parallel relationship to each other. These legs are connected to the tongue by suitable means, such as the bolt 33 extending through registering apertures in the legs and the tongue part 24 and the legs are preferably provided at their normally upper ends with one or more additional holes, as indicated at 34, so that the legs can be adjustably mounted on the tongue to position their lower ends at selected distances below the tongue. Near their lower ends the legs are provided with mutually registering apertures and a wheel 35 having a centrally apertured hub is disposed between the legs 31 and 32 and below the tongue portion 24 and is journaled on the legs 31 and 32 by an axle 36 extending through the apertures near the lower ends of the legs and through the hub aperture in the wheel.

A pair of longitudinally curved skids 37 and 38 are secured at their rear ends to the axle 36 by having the axle extend through apertures in the skids near the rear ends thereof and these skids are inclined forwardly and upwardly from the axle 36 to a location on the tongue portion 24 spaced forwardly from the bolt 33. At their front, upper ends, the skids 37 and 38 are attached to the tongue by a bolt 39 which extends through registering apertures in the tongue and the skids, the skids preferably being provided in their front end portions with one or more additional apertures, as indicated at 40, so that the front ends of the skids can also be adjustably connected to the tongue.

Figure 2:
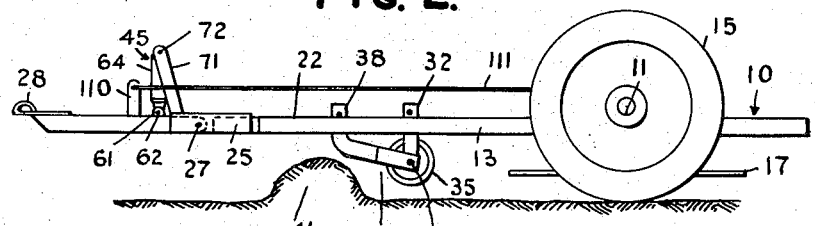
Figure 2 is a side elevational view of the implement, tongue and truck assembly illustrated in Figure 1.
Figure 3:
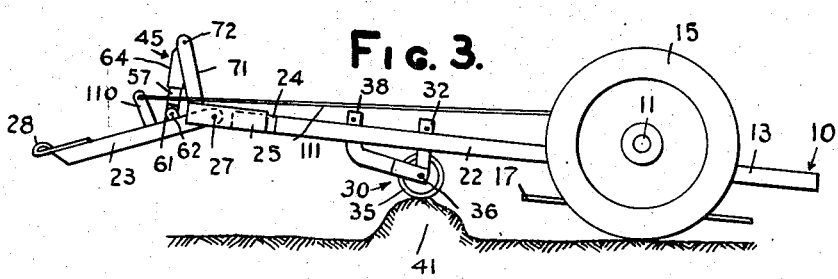
Figure 3 is a side elevational view similar to Figure 2 but showing the parts in a somewhat different operative relationship than that shown in Figure 2.

It will be noted that with this arrangement, when the wheel 35 or the skids 37 and 38 of the truck 30 ride up over an obstruction, as indicated at 41 in Figures 2 and 3, or ride up a steep incline, such as the steep side of a ditch, the front end of the rear tongue portion 24 is raised and the rear end of the front tongue portion 23 is correspondingly raised so that the tongue is bent or buckled upwardly at the pivot bolt 27 of the pivot joint between the two parts of the tongue, as illustrated in Figure 3. This inclines the cutter 17 upwardly in a forward direction so that the front portion of the cutter will ride over the obstruction instead of digging into the obstruction as would otherwise be the case, and it is further noted that this upward bending of the tongue intermediate its length permits the front end of the tongue to remain at substantially the same distance from the ground at all times so that there is no upward thrust on the connection between the tongue and the towing vehicle.

A time delaying means, generally indicated at 45, is connected between the two parts of the tongue adjacent the pivotal joint in the tongue to maintain the tongue in its upwardly bent position for a predetermined time after the truck 30 has been raised by a steep incline or an obstruction in the path of the associated implement to insure that the implement will clear the incline or the obstruction before the tongue returns to its normally straight condition, as illustrated in Figure 2.

The time delay mechanism illustrated includes a hydraulic dashpot and means for operatively connecting the dashpot to the front and rear portions of the tongue adjacent the pivotal joint in the tongue. The dashpot comprises a cylinder 46 having one end closed by an end wall 47 and its other end closed by an end closure plug 48 threaded into the corresponding end of the cylinder and provided with a centrally disposed aperture 49 in which is mounted a bearing bushing 50, a piston 51 reciprocable in the cylinder 46 and a piston rod 52 secured at one end to the piston 51 and extending from the piston through the bearing bushing 50 and the end plug 48 of the cylinder. A suitable packing 53 is disposed in the bore or aperture 49 at the outer end of the bushing 50 and a gland nut 54 is threaded on to an externally screw threaded neck 55 of the plug 48 and compresses the packing 53 around the piston rod 52 to provide a substantially leak-proof joint between the piston rod and the cylinder end plug 48.

A cover part 56, including a cylindrical container portion 57 receiving the lower portion of the cylinder 46 and the end plug 48, has a flat end wall 58 closing the lower end of the cylindrical receptacle 57 and a lug formation 59 projecting from the center of the end wall 58 in a direction opposite that in which the container 57 projects from the end wall and provided near its end remote from the end wall with an aperture 60. The lug formation 59 is received between spaced apart, apertured lugs 61 extending upwardly from the front portion 23 of the tongue near the front end of the channel member 25 and is pivotally connected to these lug formations by a bolt 62. At its inner side the end wall 58 is provided with a centrally located, screw threaded recess which receives the screw threaded portion 63 of the piston rod 52 remote from the piston 51. The cover also includes a second receptacle 64 of cylindrical shape which overlaps and telescopically receives the receptacle 57 and is closed at its upper end by an end wall 65 to which the upper end of the cylinder 46 is rigidly secured by suitable means, such as the bolts 66 extending through registering apertures in the cover end wall 65 and the cylinder end wall 47.

A lug formation 67 is provided on and extends upwardly from the top end wall 65 of the cover and this lug formation is provided near its upper end with an aperture 68.

A pair of bracket legs 70 and 71 are secured at their lower ends to the channel member 25 at the front end of this channel member and are inclined upwardly and forwardly from the channel member in substantially parallel relationship to each other to a location above the top end wall 65 of the cover 56. Near their upper ends the bracket legs 70 and 71 are provided with apertures and a bolt 72 extends through these apertures and through the aperture 68 in the lug formation 67 to pivotally connect the bracket legs to the top of the cover of the hydraulic dashpot.

With this arrangement, when the tongue is bent upwardly from its normally straight condition illustrated in Figure 2, to its bent or buckled condition illustrated in Figure 3, the piston 51 is moved downwardly in the cylinder 46 toward the end plug 48 at the lower end of the cylinder and, when the tongue returns to its normally straight condition, the piston is moved upwardly in the cylinder to a location adjacent the top end wall 47 of the cylinder, as illustrated in Figure 6.

A fitting 74 is mounted in the top end wall 47 of the cylinder and extends through the top end wall 65 of the cover 56 and an adjustable valve, generally indicated at 75, is mounted at one end on the fitting 74 in communication with the interior of the cylinder 46 at the upper end of the cylinder. A second fitting 76 is mounted in the side wall of the cylinder near the upper end of the screw plug 48 and a conduit 77 extends from the fitting 76 to a fitting 78 mounted in the adjustable needle valve assembly 75.

Figures 9, 10:
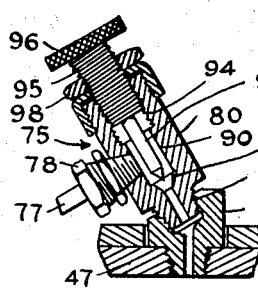
Figure 9 is a fragmentary cross sectional view on an enlarged scale on the line 9—9 of Figure 4.
Figure 10 is a fragmentary cross sectional view on an enlarged scale on the line 10—10 of Figure 6.

As illustrated in Figure 9, the needle valve assembly 75 comprises a cylindrical body 80 having a bore 90 extending therethrough and reduced at one end to provide a conical valve seat 91 in the bore. Surrounding the reduced end portion of the bore 90 the body 80 is provided with a reduced and externally screw threaded extension 92 threaded into a screw threaded recess in the fitting 74 so that the reduced portion of the bore in the valve body is continuous with a bore 93 in the fitting 74.

The fitting 78 is threaded into a screw threaded aperture provided in the side wall of the body 80 and has a bore communicating with the intermediate portion of the bore 90 of the valve body. At the end of the body 80 remote from the extension 92 the bore 90 is enlarged and internally screw threaded, as indicated at 94, and a screw threaded stem 95 is threaded into the screw threaded portion 94 of the bore 90 and carries on its outer end a thumb wheel 96. A valve needle 97 extends coaxially from the inner end of the stem 95 and has a pointed distal end cooperating with the valve seat 91 in the body 80 to variably restrict the fluid passage through the valve from the fitting 74 to the fitting 78. A lock nut 98 is preferably threaded onto the stem 95 at the adjacent end of the body 80 to releasably lock the stem 95 in selected positions of adjustment relative to the body 80 for adjustably restricting the fluid passage from the top end to the bottom end of the cylinder 46.

A fitting 100 is mounted in the side wall of the cylinder 46 and communicates with the interior of the cylinder at the upper end of the cylinder and a check valve 101 is mounted in the cylinder side wall and communicates with the interior of the cylinder at the upper side or end of the plug 48. A conduit 102 connects the valve 101 to the fitting 100 for the flow of hydraulic fluid from the lower to the upper end of the cylinder.

The check valve, as illustrated in Figure 10, comprises a cylindrical valve body 103 having a bore 104 extending therethrough and restricted at one end of the bore to provide a valve seat 105 for a ball valve 106. A screw threaded extension of reduced diameter surrounds the restricted portion of the bore 104 and is threaded into a tapped hole in the cylinder side wall 46 to secure the valve to the cylinder in communication with the interior of the cylinder. A screw plug 107 is threaded into the outer end of the bore 104 and a compression spring 108 disposed in the bore 104 between the plug 107 and the valve ball 106 resiliently urges the valve ball to seating engagement with the valve seat 105.

The check valve 101 provides a substantially unrestricted flow of hydraulic fluid from the space in the cylinder 46 below the piston 51 to the space in the cylinder above the piston so that the cylinder can move upwardly relative to the piston upon upward bending of the tongue 20 with no substantial resistance to such upward bending of the tongue. The check valve, however, precludes return flow of fluid through the conduit 102 from the space above the piston to the space below the piston and the return flow of fluid in this direction must take place through the restricted needle valve 75. This needle valve can be adjusted for a return of the tongue from its upwardly bent position to its straight condition within any desired time interval within practical limits so that the tongue can be mantained in its upwardly bent condition until the cutter 17 of the implement has passed over the obstruction 41 before the tongue returns to its straight condition to lower the front portion of the cutter to its normal position adjacent the surface of the ground.

A lever 110 extends upwardly from the front tongue portion 23 adjacent the front end of the channel member 25 and is preferably offset to one side of the tongue and a link 111 connects the upper end of the lever 110 to a clutch-operating lever 112 which operates a clutch between the power plant 16 and the cutter 17 of the implement. When the tongue is bent upwardly, as illustrated in Figure 3, the lever 110 pulls on the link 111 and disengages the implement clutch so that the cutter of the implement will not be damaged as it rides over the obstruction, which may be a stone or a stump, the clutch being reengaged automatically when the tongue returns to its normally straight condition.

While the tongue and truck assembly of the present invention has been shown as applied to a grass cutter or mower having a cutter rotatable about a substantially vertical axis, it is to be understood that it may be applied with equal facility to other implements having cutting or tilling implements which have to be raised over obstructions for successful operation of the implements, such other implements including other types of mowers, grain binders, harvester-thresher combines, and even certain types of cultivating implements.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing decription, and all changes which come within the meaning and range of equivalency of the claims are, therefore, intended to be embraced therein.

What is claimed is:

1. An implement tongue and truck assembly comprising a normally straight tongue adapted to be connected at one end to an implement and at its other end to a vehicle said tongue having intermediate its length a pivotal joint with a substantially horizontal axis extending transversely of the tongue, a truck disposed below and secured to said tongue at a location between said pivotal joint and said one end of the tongue and effective to bend said tongue upwardly when said truck rides up over an obstruction in the path of the associated implement, and time delay means mounted on said tongue adjacent said pivotal joint and connected to the parts of the tongue at the respectively opposite sides of said joint to delay the return of said tongue to its normally straight condition after it has been bent upwardly by upward movement of said truck.

2. In combination with a vehicle having a frame and an axle extending transversely of said frame, a tongue and truck assembly comprising a normally straight tongue secured at one end to the front end of said implement frame and including a front part and a rear part disposed substantially in longitudinal alignment when said tongue is in straight condition, means hingedly connecting the adjacent ends of the two parts of said tongue together for selective movement of said parts about an axis substantially parallel to the axle of said implement, a truck disposed below and secured to the rear part of said tongue near the rear end of said rear part and effective to bend said tongue upwardly at the hinge joint between the parts thereof upon upward movement of said truck, and time delay means mounted on said tongue adjacent said hinge joint and connected to the two parts of the tongue for delaying the return of the tongue from its upwardly bent to its normally straight condition.

3. In combination with a vehicle having a frame and an axle extending transversely of said frame, a tongue and truck assembly comprising a normally straight tongue secured at one end to the front end of said implement frame and including a front part and a rear part disposed substantially in longitudinal alignment when said tongue is in straight condition, means hingedly connecting the adjacent ends of the two parts of said tongue together for selective movement of said parts about an axis substantially parallel to the axle of said implement, a truck disposed below and secured to the rear part of said tongue near the rear end of said rear part and effective to bend said tongue upwardly at the hinge joint between the parts thereof upon upward movement of said truck, and time delay means mounted on said tongue adjacent said hinge joint and connected to the two parts of the tongue for delaying the return of the tongue from its upwardly bent to its normally straight condition, said truck including a pair of spaced apart and substantially parallel skids connected at their front ends to the rear part of said tongue and inclined rearwardly and downwardly from the connection of the front ends thereof with the rear part of said tongue, an axle extending between said skids near the rear end thereof, and a wheel disposed between said skids and journaled on said axle.

4. In combination with a vehicle having a frame and an axle extending transversely of said frame, a tongue and truck assembly comprising a normally straight tongue secured at one end to the front end of said implement frame and including a front part and a rear part disposed substantially in longitudinal alignment when said tongue is in straight condition, means hingedly connecting the adjacent ends of the two parts of said tongue together for selective movement of said parts about an axis substantially parallel to the axle of said implement, a truck disposed below and secured to the rear part of said tongue near the rear end of said rear part and effective to bend said tongue upwardly at the hinge joint between the parts thereof upon upward movement of said truck, and time delay means mounted on said tongue adjacent said hinge joint and connected to the two parts of the tongue for delaying the return of the tongue from its upwardly bent to its normally straight condition, said time delay means comprising a hydraulic dashpot expandable substantially without restriction and collapsible with adjustable restriction, and means connecting one end of said dashpot to the front part of said tongue and the other end of said dashpot to the rear part of said tongue.

5. A vehicle having a wheel supported frame supporting a power driven implement, means for rendering said implement inoperative, and a tongue and truck assembly, said tongue comprising a plurality of pivotally connected members of which one of said members is rigidly connected to said frame, said truck being rigidly connected to and depending below said rigidly connected member to effect relative movement between said pivotally connected members upon encountering an obstacle in the path of said truck, and kinematic means connected between one of the other of said pivotally connected members and said means for rendering said implement inoperative, whereby relative pivotal movement of said one and the other of said pivotally connected members effects the inoperation of said implement.

6. A vehicle including a frame, means supporting the latter in elevated position above a surface to be traversed by said vehicle, a power driven implement mounted on said frame, means for rendering said implement inoperative, and a tongue and truck assembly connected with said frame, said tongue comprising a plurality of pivotally connected members of which one of said members is rigidly connected with said frame, said truck comprising a pair of spaced elongated substantially parallel members connected to said one member and depending therefrom, an obstacle engaging element supported between said parallel members to effect relative pivotal movement between said one and at least one of the other of said pivotally connected members upon engagement with said obstacle, a lever fixedly secured to the other of said pivotally connected members, and a link having one of its ends pivotally connected to said lever and the other end thereof connected with said second named means, whereby relative movement between said one and other pivotally connected members effects operation of said second named means to render said implement inoperative.

References Cited in the file of this patent
UNITED STATES PATENTS

| | | |
|---|---|---|
| 2,385,099 | Nelson | Sept. 18, 1945 |
| 2,490,645 | Murat | Dec. 6, 1949 |
| 2,592,991 | Yeager et al. | Apr. 15, 1952 |
| 2,621,457 | Rosenberg | Dec. 16, 1952 |